US008642220B2

(12) United States Patent
Zhang et al.

(10) Patent No.: US 8,642,220 B2
(45) Date of Patent: Feb. 4, 2014

(54) METHOD TO IMPROVE FUEL CELL SYSTEM PERFORMANCE USING CELL VOLTAGE PREDICTION OF FUEL CELL STACK

(75) Inventors: Yanyan Zhang, Farmington, NY (US); Sriram Ganapathy, Rochester, NY (US); Loren Devries, Rochester, NY (US); Bruce J. Clingerman, Palmyra, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 725 days.

(21) Appl. No.: 12/567,381

(22) Filed: Sep. 25, 2009

(65) Prior Publication Data

US 2011/0076582 A1 Mar. 31, 2011

(51) Int. Cl.
*H01M 8/04* (2006.01)
(52) U.S. Cl.
USPC ............... 429/430; 429/432; 429/431
(58) Field of Classification Search
USPC ........................................ 429/430
See application file for complete search history.

(56) References Cited

U.S. PATENT DOCUMENTS

| | | | | |
|---|---|---|---|---|
| 2003/0008188 A1* | 1/2003 | Aoyagi et al. | ................... | 429/23 |
| 2008/0102326 A1* | 5/2008 | Falta | ................ | 429/13 |
| 2008/0182139 A1* | 7/2008 | Ganapathy et al. | ............. | 429/13 |
| 2009/0061263 A1* | 3/2009 | Watanabe | ....................... | 429/13 |
| 2009/0197125 A1* | 8/2009 | Salvador et al. | ................ | 429/13 |
| 2010/0136451 A1* | 6/2010 | Imanishi et al. | .............. | 429/432 |
| 2011/0223505 A1* | 9/2011 | Ganapathy et al. | ........... | 429/431 |

FOREIGN PATENT DOCUMENTS

| | | | |
|---|---|---|---|
| JP | 2008258035 A | * | 10/2008 |
| WO | WO 2007085956 A1 | * | 8/2007 |
| WO | WO 2009005136 A1 | * | 1/2009 |

OTHER PUBLICATIONS

Gorgun et al, Journal of Power Sources 157 (2006) 389-394, available online Sep. 12, 2005.*
Gorgun, "Dynamic modeling of a proton exchange membrane (PEM) electrolyzer", International Journal of Hydrogen Energy, Jan. 2006, vol. 31 Issue 1 pp. 29-38.*

* cited by examiner

*Primary Examiner* — Patrick Ryan
*Assistant Examiner* — Lucas J. O'Donnell
(74) *Attorney, Agent, or Firm* — John A. Miller; Miller IP Group, PLC

(57) ABSTRACT

A system and method for determining the maximum allowed stack current limit rate for a fuel cell stack that considers cell voltage. The method includes estimating a fuel cell stack voltage based on a fuel cell resistance value, stack variables and a current request signal. The fuel cell resistance value can be modeled based on stack temperature and stack relative humidity. The stack variables can include exchange current density and mass transfer coefficient. The method then uses the estimated fuel cell voltage and a look-up table based on estimated voltage to determine a current rate limit value for changing the current of the stack. The method then adds the current rate limit value and the current request signal to obtain the current set-point.

18 Claims, 2 Drawing Sheets

METHOD TO IMPROVE FUEL CELL SYSTEM PERFORMANCE USING CELL VOLTAGE PREDICTION OF FUEL CELL STACK

BACKGROUND OF THE INVENTION

1. Field of the Invention

This invention relates generally to a system and method for predicting the voltage of a fuel cell stack and determining the maximum allowed stack current limit rate for a fuel cell stack and, more particularly, to a system and method for determining the maximum allowed stack current limit rate for a fuel cell stack that includes using an estimated cell voltage.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs and gas diffusion media layers in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The stack controller needs to know the current/voltage relationship, referred to as a polarization curve, of the fuel cell stack to schedule stack reactant flows in accordance with stack power demands. The relationship between the voltage and the current of the stack is typically difficult to define because it is non-linear, and changes depending on many variables, including stack temperature, stack partial pressures and cathode and anode stoichiometries. Additionally, the relationship between the stack current and voltage changes as the stack degrades over time. Particularly, an older stack will have lower cell voltages, and will need to provide more current to meet the power demands than a new, non-degraded stack.

The response time of a fuel cell stack to a requested power demand from the vehicle driver is different for different operating conditions of the stack. The stack responds relatively slowly when the requested current is large or the stack operating conditions are extreme and relatively quickly when the requested current is small or the stack operating conditions are optimal. The current rate limit of the fuel cell stack needs to be determined based on the stack performance to minimize the response time and maximize the stack performance.

In current vehicle fuel cell systems, the current rate limit for increases in current provided by a fuel cell stack is determined using a look-up table. Particularly, the temperature of the cooling fluid flowing in the fuel cell stack and the relative humidity at the inlet of the cathode is provided to the look-up table, which provides the current rate limit based on those values. The current rate limit is provided to an algorithm along with the current request to provide a stack current set-point to adjust the current output of the stack based on the current rate.

Based on this process, the current rate limit would be the same at the same temperature and relative humidity regardless of the requested current and degradation of the fuel cell stack over the life of the stack. More particularly, at large or small current requests, or at the beginning of the life of the stack or the end of the life of the stack when the stack performs completely different, the current rate limit would be the same at the same temperature and relative humidity. However, such a current rate limit process does not lead to optimal performance of the fuel cell stack. Particularly, the current rate limit is not the quickest for all temperature and relative humidity values for various stack operating conditions, and thus, more than the stack temperature and relative humidity determine stack performance. For example, because the current rate limit is not based on cell voltage, the current rate limit may cause the voltage of a fuel cell within the stack to drop too quickly, which could damage the stack. Because the goal is to change the stack current as quickly as possible to the requested value without damaging the stack by extremely low cell voltage, it is desirable to provide an optimum current rate limit that provides this function without causing a cell voltage to drop below a predetermined (threshold) value.

SUMMARY OF THE INVENTION

In accordance with the teachings of the present invention, a system and method are disclosed for determining the maximum allowed stack current limit rate for a fuel cell stack that considers cell voltage. The method includes estimating a fuel cell stack voltage based on a fuel cell resistance value, stack variables and a current request signal. The fuel cell resistance value can be modeled based on stack temperature and stack relative humidity. The stack variables can include exchange current density and mass transfer coefficient. The method then uses the estimated fuel cell voltage and a look-up table based on estimated voltage to determine a current rate limit value for changing the current of the stack. The method then adds the current rate limit value and the current request signal to obtain the current set-point.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining the maximum allowed stack current limit rate for a fuel cell stack that uses an estimated cell voltage is merely exemplary in nature, and is in no way intended to limit the invention or its applications or uses.

Figure 1:
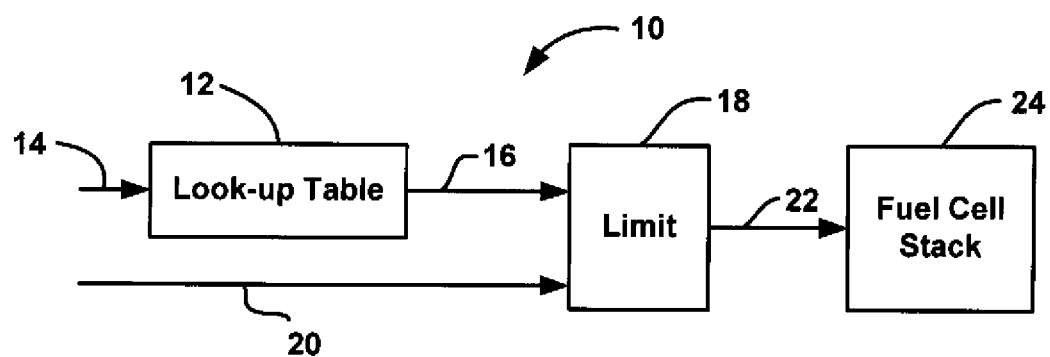
FIG. 1 is a schematic block diagram of a known system for setting the current rate limit of a fuel cell stack.

FIG. 1 is a schematic block diagram of a current set-point system 10 of the type known in the art and discussed above. The system 10 includes a look-up table 12 that receives temperature and relative humidity input signals on line 14. Based on the temperature and relative humidity input signals, the look-up table 12 provides a current rate limit value R on line 16 that is sent to a limit processor 18. The limit processor 18 also receives a current request value $I_{req}$ on line 20 that identifies a current set-point value $I_{sp}$ to be provided to a fuel cell stack 24, typically from a vehicle driver request, on line 22. The limit processor 18 provides the current set-point value $I_{sp}$ to the fuel cell stack 24 so that the current provided by the stack 24 increases at the desired current rate limit value R. However, as discussed above, the system 10 has limitations on performance.

The present invention proposes a system and method for determining the current set-point value $I_{sp}$ that considers other system parameters, such as cell voltage, to improve fuel cell stack performance and reduce the potential for stack damage. The current up-transient power response from a fuel cell stack is an important consideration for vehicle performance. The present invention provides a quick up-transient power responses at high cell voltage predictions, usually at low current requests or good operating conditions, such as warm and humid conditions. Further, the present invention provides lower up-transient power responses at low cell voltage, usually for large current requests or poor operating conditions, such as extreme dry or cold conditions.

The present invention calculates a predicted or estimated cell voltage $E_{cell}$ as a function of a fuel cell resistance value $R_{HFR}$, stack variables, which also reflect aging effects of the fuel cell stack and current request signals from the vehicle driver. The fuel cell resistance value $R_{HFR}$ defines a high frequency resistance on the fuel cell stack that gives an indication of stack relative humidity and temperature. The fuel cell resistance value $R_{HFR}$ can be a measured value or a model value, as is well understood to those skilled in the art. The fuel cell resistance value $R_{HFR}$ can be calculated as a function of stack inlet and outlet temperature and relative humidity, which is also a function of inlet and outlet temperature, pressure and flow rate. Therefore, the fuel cell resistance value $R_{HFR}$ represents the stack operating conditions including temperature, pressure and cathode flow rate.

In one embodiment, the predicted or estimated cell voltage $E_{cell}$ is calculated by:

$$E_{cell} = E_{rev} - (j+a) * R_{HFR} - \left(0.07 * \log_{10}\left(\frac{j+a}{j^0}\right) + c\log_{10}\left(1 - \frac{j}{j^\infty}\right)\right) \quad (1)$$

Where,
$E_{cell}$ it is cell voltage (V),
j is stack current density (A/cm$^2$),
$R_{HFR}$ is the cell HFR resistance (ohm cm$^2$),
$E_{rev}$ is a thermodynamic reversible cell potential (V),
a is the background current density from cell shorting/cell crossover (A/cm$^2$),
$j^0$ ($\theta_1$) is the exchange current density (A/cm$^2$), which is calculated from the stack current request value divided by the active area of the MEA,
$j^\infty$ is the limiting current density (A/cm$^2$), and
c ($\theta_2$) is the mass transfer coefficient.

The value $j^0$ is also known as value $\theta_1$ and the value c is also known as the value $\theta_2$, which are unknowns and are estimated from an algorithm using least squares fitting from online collected data. A detailed discussion of a system and method for estimating a stack polarization curve including determining exchange current density and mass transfer coefficient can be found in U.S. patent application Ser. No. 11/669,898, filed Jan. 31, 2007, titled algorithm for online adaptive polarization curve estimation of a fuel cell stack, assigned to the assignee of the application and herein incorporated by reference.

The fuel cell resistance value $R_{HFR}$ is not a constant value and is a function of stack temperature and relative humidity. The cell voltage is estimated at different temperatures and humidification conditions by including the fuel cell resistance value $R_{HFR}$. In one embodiment, the fuel cell resistance value $R_{HFR}$ can be estimated based on temperature and relative humidity as:

$$R_{HFR} = R_m + R_{contact} = \frac{t}{\sigma_m} + R_{contact} \quad (2)$$

$$\sigma_m = (0.5139\lambda - 0.326) \times 1268 \times \left(0.0033 - \frac{1}{T}\right)$$

Where,
$R_m$ is membrane resistance,
$\sigma_m$ is membrane electrical conductivity,
t is membrane thickness,
$R_{contact}$ is contact resistance, and
$\lambda$ is water content, which is a function of relative humidity.

Figure 2:
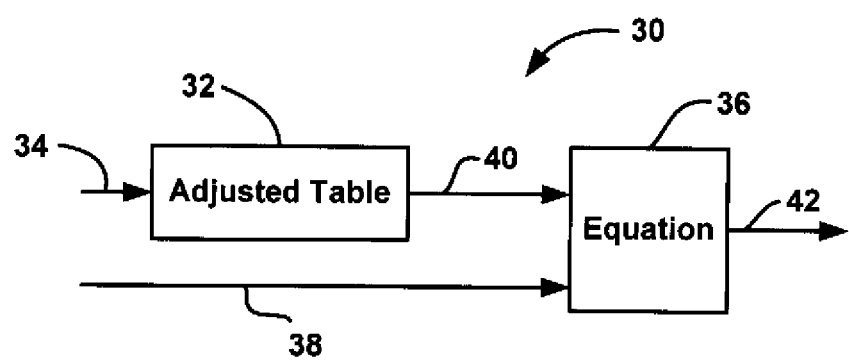
FIG. 2 is a schematic block diagram of a system for determining cell voltage.

FIG. 2 is a schematic block diagram of a system 30 for calculating the estimated cell voltage $E_{cell}$. The system 30 includes an adjusted table 32 that receives inputs on line 34 to determine the fuel cell resistance value $R_{HFR}$. In alternate embodiments, the fuel cell resistance value $R_{HFR}$ can be actual measured values or estimated values. The table 32 can model the fuel cell resistance value $R_{HFR}$ using equation (2), or use some other suitable model or estimation process. The table 32 outputs the fuel cell resistance value $R_{HFR}$ on line 40 to an equation block 36 to calculate the cell voltage $E_{cell}$ using equation (1). The equation block 36 also receives the requested current value $I_{req}$, which becomes current density in the equations below, and the values $\theta_1$ and $\theta_2$ on line 38. The estimated cell voltage $E_{cell}$ is output from the equation block 36 on line 42.

Figure 3:
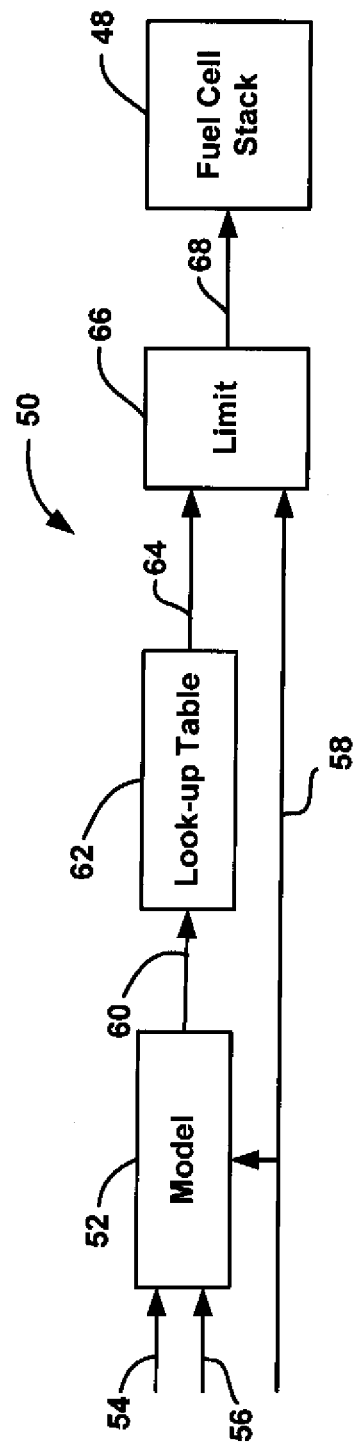
FIG. 3 is a schematic block diagram of a system for determining the current rate limit for a fuel cell stack that considers the cell voltage from FIG. 2.

FIG. 3 is a schematic block diagram of a system 50 for determining the current set-point value $I_{sp}$ for a fuel cell stack 48 based on the discussion above that includes using the estimated cell voltage $E_{cell}$. The system 50 includes a model block 52, generally representing the system 30, that receives the temperature and relative humidity inputs on line 54, the values $\theta_1$ and $\theta_2$ on line 56 and the requested current value $I_{req}$ on line 58. The model block 52 outputs the estimated cell voltage $E_{cell}$ on line 60 that is sent to a look-up table 62. The look-up table 62 determines the current rate limit value R that is provided on line 64.

The current rate limit value R and the requested current value $I_{req}$ on the line 58 are provided to a limit block 66 that generates the current set-point value $I_{sp}$ as follows. If the current rate $\Delta I/\Delta t$, which is calculated as the requested current value $I_{req}$ minus the current set-point value $I_{sp}$ at the previous time step and divided by the time step, is greater/less than the current rate limit value R, the current set-point value $I_{sp}$ at the previous time step plus the current limit rate value R times the time step as:

$$I_{sp} = I_{sp(n-1)} + R\Delta t \qquad (3)$$

Where $I_{sp}$ is the current set-point, $I_{sp(n-1)}$ is the current set-point at the previous time step and $\Delta t$ is the time step.

If the current rate is within the range of the current limit rate value R, the current set-point value $I_{sp}$ is equal to the requested current value $I_{req}$ as:

$$I_{sp} = I_{req} \qquad (4)$$

The current set-point value $I_{sp}$ is provided to the fuel cell stack 48 on line 68 to set the current output of the stack 48 to meet the requested current value $I_{req}$ as quickly as possible without allowing a cell voltage to drop below a certain value that may damage the stack 48.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a current set-point for a fuel cell stack, said method comprising using a controller programmed to perform the following:
    estimating a fuel cell stack voltage based on a stack fuel cell resistance value, stack variables and a current request signal;
    using the estimated fuel cell voltage and a look-up table to determine a current rate limit value for changing the current of the stack; and
    adding the current rate limit value and the current request signal to obtain the current set-point.

2. The method according to claim 1 wherein estimating a fuel cell voltage includes using an estimated fuel cell resistance value that is modeled based on stack temperature and stack relative humidity.

3. The method according to claim 2 wherein the fuel cell resistance value is estimated using the equations:

$$R_{HFR} = R_m + R_{contact} = \frac{t}{\sigma_m} + R_{contact}$$

where $\sigma_m$ is determined using the equation:

$$\sigma_m = (0.5139\lambda - 0.326) \times 1268 \times \left(0.0033 - \frac{1}{T}\right)$$

where $R_m$ is membrane resistance, $\sigma_m$ is membrane electrical conductivity, t is membrane thickness, $R_{contact}$ is contact resistance and $\lambda$ is water content, which is a function of relative humidity and T is stack temperature.

4. The method according to claim 1 where estimating a fuel cell stack voltage includes using a measured stack fuel cell resistance value.

5. The method according to claim 1 where estimating the fuel cell stack voltage includes using the equation:

$$E_{cell} = E_{rev} - (j+a)*R_{HFR} - \left(0.07*\log_{10}\left(\frac{j+a}{j^0}\right) + c\log_{10}\left(1 - \frac{j}{j^\infty}\right)\right)$$

where $E_{cell}$ is cell voltage (V), j is stack current density (A/cm$^2$), $R_{HFR}$ is the cell HFR resistance (ohm cm$^2$), $E_{rev}$ is a thermodynamic reversible cell potential (V), a is the background current density from cell shorting/cell crossover (A/cm$^2$), $j^0$ is the exchange current density (A/cm$^2$), $j^\infty$ is the limiting current density (A/cm$^2$) and c is the mass transfer coefficient.

6. The method according to claim 1 wherein estimating the fuel cell voltage includes using stack variables for stack exchange current density and stack mass transfer coefficient.

7. The method according to claim 6 wherein the exchange current density and the mass transfer coefficient are estimated from an algorithm using least squares fitting from online collected data.

8. A method for determining a current set-point for a fuel cell stack, said method comprising using a controller programmed to perform the following:
    estimating a fuel cell stack voltage based on an estimated fuel cell resistance value that is modeled based on stack temperature and relative humidity, exchange current density, mass transfer coefficient and a current request signal;
    using the estimated fuel cell voltage and a look-up table to determine a current rate limit value for changing the current of the stack; and
    adding the current rate limit value and the current request signal to obtain the current set-point.

9. The method according to claim 8 wherein the fuel cell resistance value is estimated using the equations:

$$R_{HFR} = R_m + R_{contact} = \frac{t}{\sigma_m} + R_{contact}$$

where $\sigma_m$ is determined using the equation:

$$\sigma_m = (0.5139\lambda - 0.326) \times 1268 \times \left(0.0033 - \frac{1}{T}\right)$$

where $R_m$ membrane resistance, $\sigma_m$ is membrane electrical conductivity, t is membrane thickness, $R_{contact}$ is contact resistance and $\lambda$ is water content, which is a function of relative humidity and T is stack temperature.

10. The method according to claim 8 where estimating the fuel cell stack voltage includes using the equation:

$$E_{cell} = E_{rev} - (j+a)*R_{HFR} - \left(0.07*\log_{10}\left(\frac{j+a}{j^0}\right) + c\log_{10}\left(1 - \frac{j}{j^\infty}\right)\right)$$

where $E_{cell}$ is cell voltage (V), j is stack current density (A/cm²), $R_{HFR}$ is the cell HFR resistance (ohm cm²), $E_{rev}$ is a thermodynamic reversible cell potential (V), a is the background current density from cell shorting/cell crossover (A/cm²), $j^0$ is the exchange current density (A/cm²), $j^\infty$ is the limiting current density (A/cm²) and c is the mass transfer coefficient.

11. The method according to claim 8 wherein the exchange current density and the mass transfer coefficient are estimated from an algorithm using least squares fitting from online collected data.

12. A system for determining a current set-point for a fuel cell stack, said system comprising:
   a fuel cell stack;
   a controller;
   the controller programmed to:
      estimate a fuel cell stack voltage based on a stack fuel cell resistance value, stack variables and a current request signal;
      determine a current rate limit value for changing the current of the stack using the estimated fuel cell voltage and a look-up table;
and obtain the current set-point by adding the current rate limit value and the current request signal.

13. The system according to claim 12 wherein the controller is programmed to estimate the fuel cell voltage using an estimated fuel cell resistance value that is modeled based on stack temperature and stack relative humidity.

14. The system according to claim 13 wherein the fuel cell resistance value is estimated using the equations:

$$R_{HFR} = R_m + R_{contact} = \frac{t}{\sigma_m} + R_{contact}$$

where $\sigma_m$ is determined using the equation:

$$\sigma_m = (0.5139\lambda - 0.326) \times 1268 \times \left(0.0033 - \frac{1}{T}\right)$$

where $R_m$ is membrane resistance, $\sigma_m$ is membrane electrical conductivity, t is membrane thickness, $R_{contact}$ is contact resistance and $\lambda$ is water content, which is a function of relative humidity and T is stack temperature.

15. The system according to claim 12 where the controller is programmed to estimate the fuel cell voltage using a measured stack fuel cell resistance value.

16. The system according to claim 12 where the controller is programmed to estimate the fuel cell stack voltage using the equation:

$$E_{cell} = E_{rev} - (j+a)*R_{HFR} - \left(0.07*\log_{10}\left(\frac{j+a}{j^0}\right) + c\log_{10}\left(1 - \frac{j}{j^\infty}\right)\right)$$

where $E_{cell}$ is cell voltage (V), j is stack current density (A/cm²), $R_{HFR}$ is the cell HFR resistance (ohm cm²), $E_{rev}$ is a thermodynamic reversible cell potential (V), a is the background current density from cell shorting/cell crossover (A/cm²), $j^0$ is the exchange current density (A/cm²), $j^\infty$ is the limiting current density (A/cm²) and c is the mass transfer coefficient.

17. The system according to claim 12 wherein the controller is programmed to estimate the fuel cell voltage using stack variables for stack exchange current density and stack mass transfer coefficient.

18. The system according to claim 17 wherein the exchange current density variable and the mass transfer coefficient variable are estimated from an algorithm using least squares fitting from online collected data.

* * * * *